(12) United States Patent
Tatzel et al.

(10) Patent No.: US 7,953,722 B2
(45) Date of Patent: May 31, 2011

(54) QUERY RESPONSE SERVICE FOR BUSINESS OBJECTS

(75) Inventors: Steffen Tatzel, Nussloch (DE); Maic Wintel, Wiesloch (DE); Ye Jin, Nueremberg (DE); Martin Hartig, Speyer (DE)

(73) Assignee: SAP AG, Walldorf (DE)

( * ) Notice: Subject to any disclaimer, the term of this patent is extended or adjusted under 35 U.S.C. 154(b) by 398 days.

(21) Appl. No.: 11/963,751

(22) Filed: Dec. 21, 2007

(65) Prior Publication Data

US 2009/0164414 A1 Jun. 25, 2009

(51) Int. Cl.
*G06F 17/30* (2006.01)

(52) U.S. Cl. ......... 707/706; 707/717; 707/728; 707/763

(58) Field of Classification Search .................. 707/705, 707/707, 714, 718; 719/310, 316, 330
See application file for complete search history.

(56) References Cited

U.S. PATENT DOCUMENTS

| | | | |
|---|---|---|---|
| 6,263,342 B1 * | 7/2001 | Chang et al. ........................... | 1/1 |
| 6,694,328 B1 * | 2/2004 | Bennett ................................. | 1/1 |
| 7,110,997 B1 * | 9/2006 | Turkel et al. ......................... | 1/1 |
| 2001/0049685 A1 * | 12/2001 | Carey et al. ............... | 707/103 R |
| 2002/0123984 A1 * | 9/2002 | Prakash ............................ | 707/1 |
| 2002/0138582 A1 * | 9/2002 | Chandra et al. ............... | 709/206 |
| 2002/0174130 A1 * | 11/2002 | Wagner .......................... | 707/102 |
| 2004/0088325 A1 * | 5/2004 | Elder et al. .................. | 707/104.1 |
| 2004/0169654 A1 * | 9/2004 | Walker et al. .................. | 345/440 |
| 2004/0243613 A1 * | 12/2004 | Pourheidari .................. | 707/102 |
| 2005/0071342 A1 * | 3/2005 | Calusinski ..................... | 707/100 |
| 2005/0256852 A1 * | 11/2005 | McNall et al. ..................... | 707/3 |
| 2006/0129974 A1 * | 6/2006 | Brendle et al. ................ | 717/108 |
| 2007/0118553 A1 * | 5/2007 | Zhou et al. ..................... | 707/102 |
| 2007/0118844 A1 * | 5/2007 | Huang et al. .................. | 719/330 |
| 2007/0168335 A1 * | 7/2007 | Moore et al. ....................... | 707/3 |
| 2007/0192337 A1 * | 8/2007 | Chandrasekar et al. ....... | 707/100 |
| 2007/0226203 A1 * | 9/2007 | Adya et al. ......................... | 707/4 |
| 2008/0114803 A1 * | 5/2008 | Chinchwadkar et al. ..... | 707/102 |
| 2008/0306983 A1 * | 12/2008 | Singh .............................. | 707/102 |
| 2009/0106191 A1 * | 4/2009 | Gutlapalli et al. ................ | 707/2 |
| 2009/0132503 A1 * | 5/2009 | Sun et al. .......................... | 707/4 |
| 2010/0223262 A1 * | 9/2010 | Krylov et al. .................. | 707/728 |

\* cited by examiner

*Primary Examiner* — Hanh B Thai
(74) *Attorney, Agent, or Firm* — Mintz, Levin, Cohn, Ferris, Glovsky and Popeo, P.C.

(57) ABSTRACT

Methods and apparatus, including computer program products, for a query response service for business objects. In general, data characterizing a request to perform a query on multiple instances of a business object may be received, where the query includes selection criteria for multiple attributes across multiple nodes for each of the instances of the business object. The query may be initiated on the instances of the business object. Results including values from the attributes across the nodes of the business objects may be returned. The query may be assigned to a node of the business object, which may be a query response transformation node. The node may include a combination of attributes associated with the attributes across the nodes of the business object. Results may be sorted on a server, sent as pages to a client, or both.

13 Claims, 10 Drawing Sheets

QUERY RESPONSE SERVICE FOR BUSINESS OBJECTS

BACKGROUND

The present disclosure relates to data processing by means of a digital computer, and more particularly to a query response service for business objects.

In general, enterprise systems may operate at an application platform-level by having business objects describe a structure and behavior of real-world objects. A business object may include a hierarchy of business object nodes, which represent data as attributes; may be an independently viable entity with identifiable instances; may bundle functions and data, both of which may be accessible from outside of the business object; may be described by a data model, an internal process model, and one or more service interfaces; and may be a core structuring element of applications that are centrally defined by a developer as part of an overall governance process.

Business objects may be stored in database data structures, such as tables and indexes. Querying instances of a business object may be performed by searching database data structures.

SUMMARY

The subject matter disclosed herein provides methods and apparatus, including computer program products, that implement techniques related to a query response service for business objects.

In one general aspect, data characterizing a request to perform a query on multiple instances of a business object is received, where the query includes selection criteria for multiple attributes across multiple nodes for each of the instances of the business object. The query is initiated on the instances of the business object. Results including values from the attributes across the nodes of the business objects are returned.

In a related aspect, data characterizing a request to perform a query on multiple instances of a business object is received at a query service assigned to a query response transformation node of the business object. The query is defined to return results including multiple attributes across multiple nodes for each of the instances of the business object. Results of the query are to be a subset of attributes of the business object specified by the query. The request is from a client consumer of the query service. The query on the instances of the business object is initiated by calling a search infrastructure to perform the query. The calling of the search infrastructure includes a query parameter structure of query criteria. Results including values from the attributes across the nodes of the business objects are returned to a query view at the client consumer. Returning results to the query view is based on a mapping of attributes of the query response transformation node to fields of the query view.

The subject matter may be implemented as, for example, computer program products (e.g., as source code or compiled code tangibly embodied in computer-readable media), computer-implemented methods, and systems.

Variations may include one or more of the following features.

The query may be assigned to a node of the business object. The node to which the query is assigned may include a combination of attributes associated with the attributes across the nodes of the business object. The query may further include attributes of other business objects, such as business objects from a foundation layer of business objects for an application platform in which the business objects are used. The node to which the query is assigned may be a transformation node in a schema of nodes including data nodes, associated nodes, and transformation nodes. Attributes of the node to which the query is assigned may be a union of query result attributes of queries assigned to that node.

Results may be sorted on a server and returning results may include returning sorted results.

Receiving a request to perform a query, initiating the query, and returning results of the query may be performed by a query service on a server provider system. The query may be performed by a search infrastructure, and the query may be requested by a client service consumer system that sends the request in a single operation and receives the results in response to the request.

A business object may include a hierarchy of nodes and the nodes may include a hierarchy of attributes. The attributes of nodes of the business object may be flattened. For example, attributes of nodes of a business object may be flattened when included in a query response transformation node.

Attributes of results of a query may be a defined subset of attributes of the business object.

The subject matter described herein can be implemented to realize one or more of the following advantages. A query may be performed across attributes of different nodes of a business object or attributes of a single node of a business object, and values across attributes of different nodes of a business object may returned as a result. In addition, a query and retrieval of information may be performed as a single operation (e.g., as a result of a single request from a client), and that query might only return only that information desired as a result (e.g., only that data required to be received in a query view or displayed in a user interface may be sent). These advantages may improve performance as, for example, communication overhead may be reduced by having fewer transactions between a client and server, and the transactions may require less data as only a tailored amount of data may be requested as a result (e.g., a server need not send all data of a business object node as all the data might not be needed by a client). Sorting, paging, or both of results may be provided at a server that responds to such a query as a final result set may be available to the server, which may reduce overhead (e.g., communications between a client and server as unsorted final sets need not be sent to a client and then sorted for a few results (e.g., a top fifty results in accordance with sorting criteria); e.g., a client need not fill buffers with all query results to perform a sorting of data to obtain a first page of data that might only have been requested).

Details of one or more implementations are set forth in the accompanying drawings and in the description below. Further features, aspects, and advantages will become apparent from the description, the drawings, and the claims.

BRIEF DESCRIPTION OF THE DRAWINGS

FIGS. 4-5 illustrate user interfaces to navigate a business object that includes a query response transformation node.

FIGS. 7-9 illustrate user interfaces to build queries to assign to a query response transformation node.

Like reference numbers and designations in the various drawings indicate like elements.

DETAILED DESCRIPTION

In general, the descriptions of FIGS. 1-10 include clients and servers. As used in the description, clients and servers may be clients and servers in the sense of a client application program and a server application program where a client application program requests services offered by a server application program. Clients and servers may be remotely located from each other and may be part of separate systems, but that need not be the case. In addition, a system may operate as both a client and a server by consuming services of a server and providing services to clients.

Figure 1:
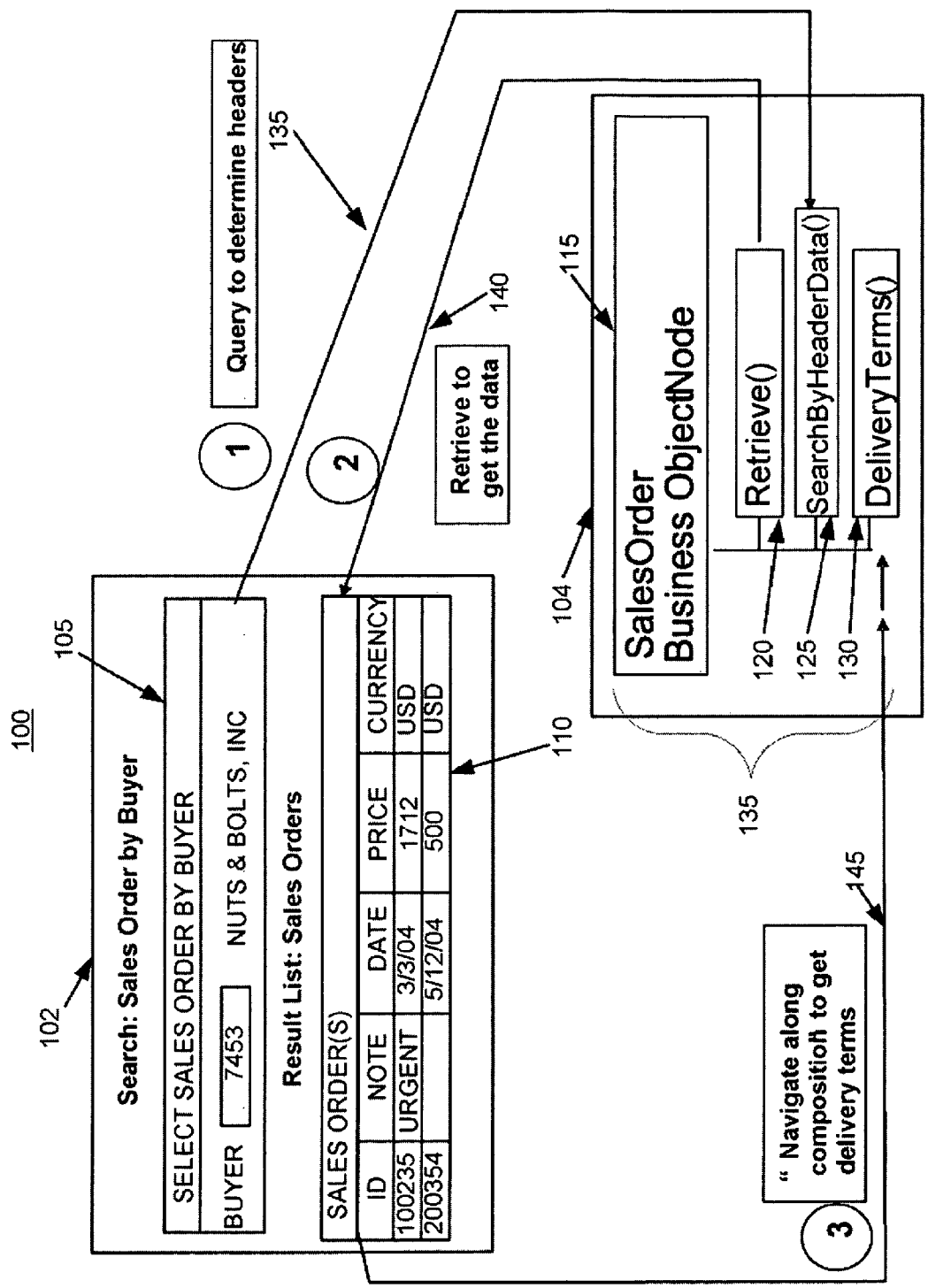
FIG. 1 is a block diagram of a system including a client requesting a query of business object information at a server and performing a follow-up request for information.

FIG. 1 is a block diagram of a system 100 including a client 102 requesting a query of business object information at a server 104 and performing a follow-up request for information. In general, the components of the system 100 are illustrated in a run-time view with the exception of a business object 135 that is illustrated with a design-time view. Although the business object 135 is illustrated with a design-time view, its functionality with respect to a run-time version of the business object 135 as part of a run-time version of the system 100 will be described.

In general, operation of the system 100 is as follows: a request to perform a query may be initiated at a first user interface 105; the request may be relayed as shown by the line 135 to a search function 125 of a business object node 115 (which is a root node of a SalesOrder business object); the query may be performed at the server 104; a list of node identifiers matching query parameters may be returned to the client 102; the client 102 may initiate retrieval of data of the node 115 by sending a retrieve request as shown by the line 140, where the request may include the node identifiers received by the client 102 and may be relayed to the retrieve function 120 of the business object node 115; the node data of instances matching the node identifiers in the retrieve request may be returned to the user interface 110 for display to a user; a request for additional data from other nodes may be sent to the business object as shown by the line 145 to the delivery terms function 130 to retrieve data from a DeliveryTerms node of a SalesOrder business object; and delivery terms data may be returned to the user interface 110 for display to a user.

The system 100 includes some restrictions. For example, to retrieve delivery terms from a delivery terms node of a SalesOrder business object in accordance with query criteria for the SalesOrder business object, the SalesOrder business object must first be queried to determine which instances of the business object match query parameters and then identifiers of those instances must be sent in a separate request for delivery terms. Other restrictions may include that a retrieve request for a business object node only returns information about that node, such that information from other nodes must be requested separately.

Figure 2:
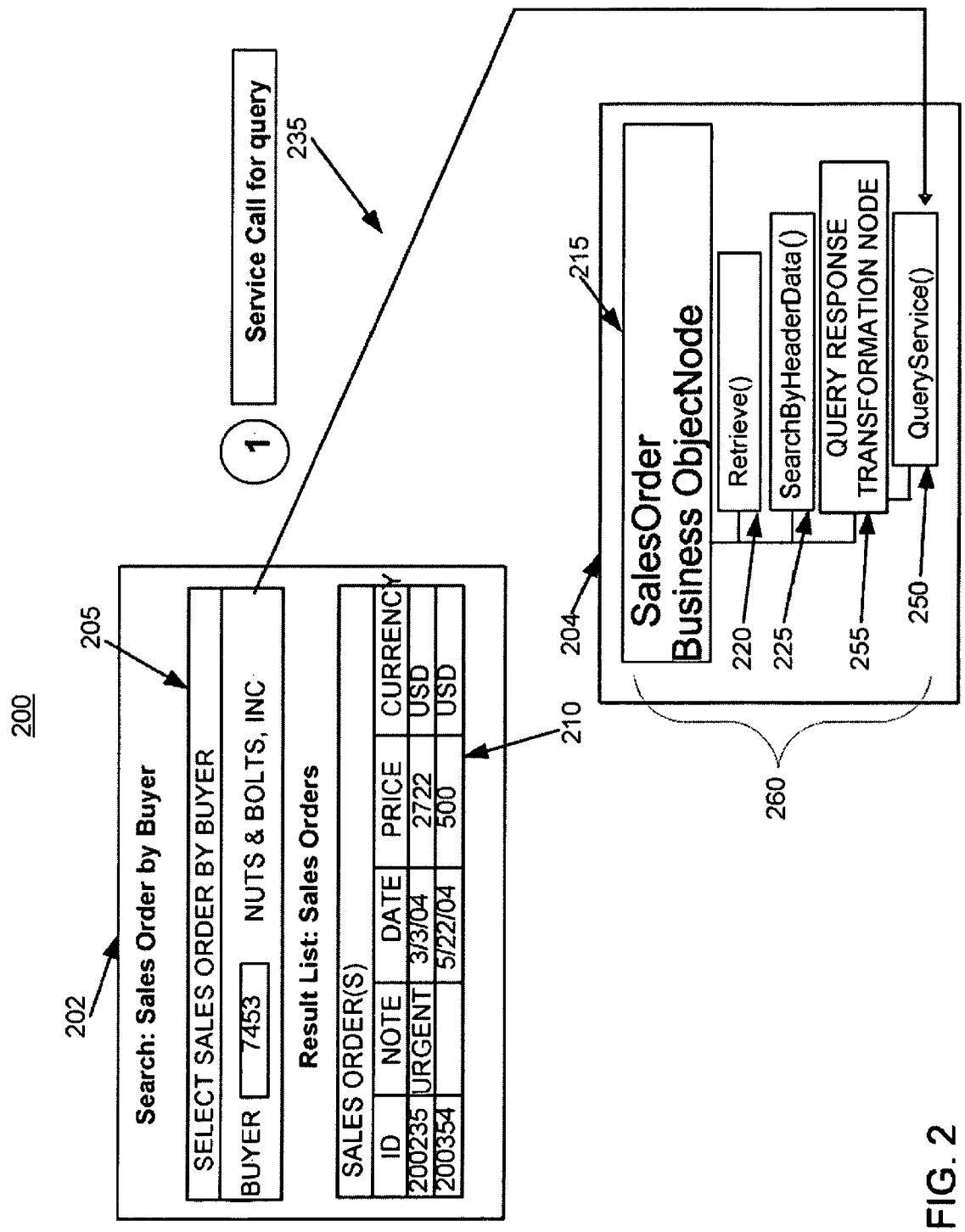
FIG. 2 is a block diagram of a system including a client requesting a query of business object information at a server by utilizing a query response service of a query response transformation node.

FIG. 2 is a block diagram of a system 200 including a client 202 requesting a query of business object information at a server 204 by utilizing a query response service 250 of a query response transformation node 255. In general, the components of the system 200 are illustrated in a run-time view with the exception of a business object 260 that is illustrated with a design-time view. Although the business object 260 is illustrated with a design-time view, its functionality with respect to a run-time version of the business object 260 as part of a run-time version of the system 200 will be described.

In general, operation of the system 200 may be as follows: a first user interface 205 of the client 202 may include query parameters that may be used in a service call for a query shown by the line 235 to the query service 250 of the query response transformation node 255; the query service may cause a query to be performed at the server 204 in accordance with query parameters of the service call and query parameters of the query service 250; the results of the query may be returned by the query service 250 to a second user interface 210 of the client 202; and the results of the query may be displayed to a user.

The first user interface 205 and the second user interface 210 may be part of a client application program, where criteria for a query may be entered in the first user interface 205 and results may be displayed in the second user interface 210. The criteria for a query may be referred to as query parameters. In addition to including criteria for a query, query parameters may further include a specification of output for results that may be displayed. The query parameters may be sent along with a service call to the server 204. For example, a query input parameter may be user-input indicating sales order records of a buyer with the identification number 7453 are to be queried, and parameters for the results may include an indication that the results are to include an identification number of a sales order, any notes, a date for the sales order, a price for the sales order, and a currency of a sales order, all of which are columns in the second user interface 210.

The sales order business object node 215 is a root node of a business object that includes the query response transformation node 255 as a child node. The business object represented by the sales order business object node 215 may include other child nodes. Nodes of the business object may include attributes that may have corresponding values.

The sales order business object node 215 includes a retrieve service 220 and a search by header data service 225. The retrieve service 220 may provide data from the sales order business object node 215 in response to a call to the retrieve service 220. Data from other nodes may be retrieved by navigating through the business object of the sales order business object node 215. The search by header data service 225 may allow for searching of instances of a sales order business object and may return one or more node identifiers of instances of the sales order business object node 215 that match search criteria. For example, the sales order business object node 215 may have attributes that include a date of generation for instances of a sales order business object and a search of a date range of generation dates requested through the search by header data service 225 may return a list of node identifiers matching the date range. Following that example, to request data other than the node identifiers, the retrieve service 220 may be called with the list of node identifiers as input. To retrieve data from other nodes of instances of a sales order business object other services may be provided.

The query response transformation node 255 is a type of node that stores as its attributes results of an execution of the query service 250. The query response transformation node 255 may be referred to as a query response transformation node because attributes of the node 255 include results of a query and the node is a type of transformation node as the data in the attributes is a result of a transformation of data from other nodes.

The query service 250 takes as its input query parameters which include criteria to perform a query and criteria of results of the query. The query service 250 includes a mapping from the input query parameters to a query view for the first user interface 205 and a mapping from the query view for the second user interface 210 to attributes of the query response transformation node 255. Using these mappings, the query service 250 may take input from a query view, apply that input to input query parameters, perform a query in accordance with the input, populate attributes of the query transformation node 255 with results of the query, and cause the query view to be populated with values from the attributes of the query response transformation node 255.

The query service 250 in combination with the query transformation node 255 may be advantageous as a query may be performed across attributes of different nodes of a business object and values across attributes of different nodes of a business object may returned as a result at a single, identifiable node of the business object. In addition to including attributes of the business object to which a query response transformation node is assigned, attributes of the query response transformation node 255 may include attributes from other business objects. Similarly, selection criteria for the query service 250 may include selection criteria for those other attributes. The other business objects from which a query response transformation node may include results and selection criteria may be applied may be limited to those business objects that are considered part of a foundation layer of business objects (e.g., master data business objects or other business objects that are in a deployment unit of a foundation layer shared across all deployments of an application platform) or form the same deployment unit of the business object that has a query response transformation exists (e.g., a selection of business objects included across deployment units may differ and business objects that are part of a same deployment unit may predictably be used for a query response transformation node). For example, for a Sales Order business object, a query response transformation node may include attributes from address data that is not part of a Sales Order business object but may be part of master data.

The attributes of nodes of the business object may be flattened. For example, attributes of nodes of a business object may be flattened when included as attributes of the query response transformation node 255.

In addition to allowing queries across attributes of different nodes of a business object and returning results at a single, identifiable node of the business object, the query and retrieval of relevant information may be performed as a single operation (e.g., as shown by the line 235), and that query might only return only that information desired as a result. For example, in contrast to a search of header data that might be followed-up with operations to retrieve all data of a business object node, a query may be a single operation of a query service and the amount of information to be returned as results may be tailored. These advantages may improve performance as, for example, communication overhead may be reduced by having fewer transactions between a client and server, and the transactions may require less data as only a tailored amount of data may be requested as a result.

In addition, the query service 250 may provide efficient sorting and paging of results. For example, as a single operation call to a server hosting the query service 250 may include all relevant query criteria and result sorting criteria, results may be sorted at the server 204 and sorted results may be returned to a client 202, rather than, for example, having multiple service calls across nodes of a business object to build a final set of data that is then sorted at the client 202. As another example, paging of data may be efficiently supported as final results may be built at the server 204 and pages of that data may be sent, rather than, for example, having final results built at the client 202 such that pages of data need be handled at the client 202. This may be efficient as only a page of data need be sent at a time from the server 204 to the client 202 rather than having unnecessary data sent to the client 202 to build a final result.

Figure 3:
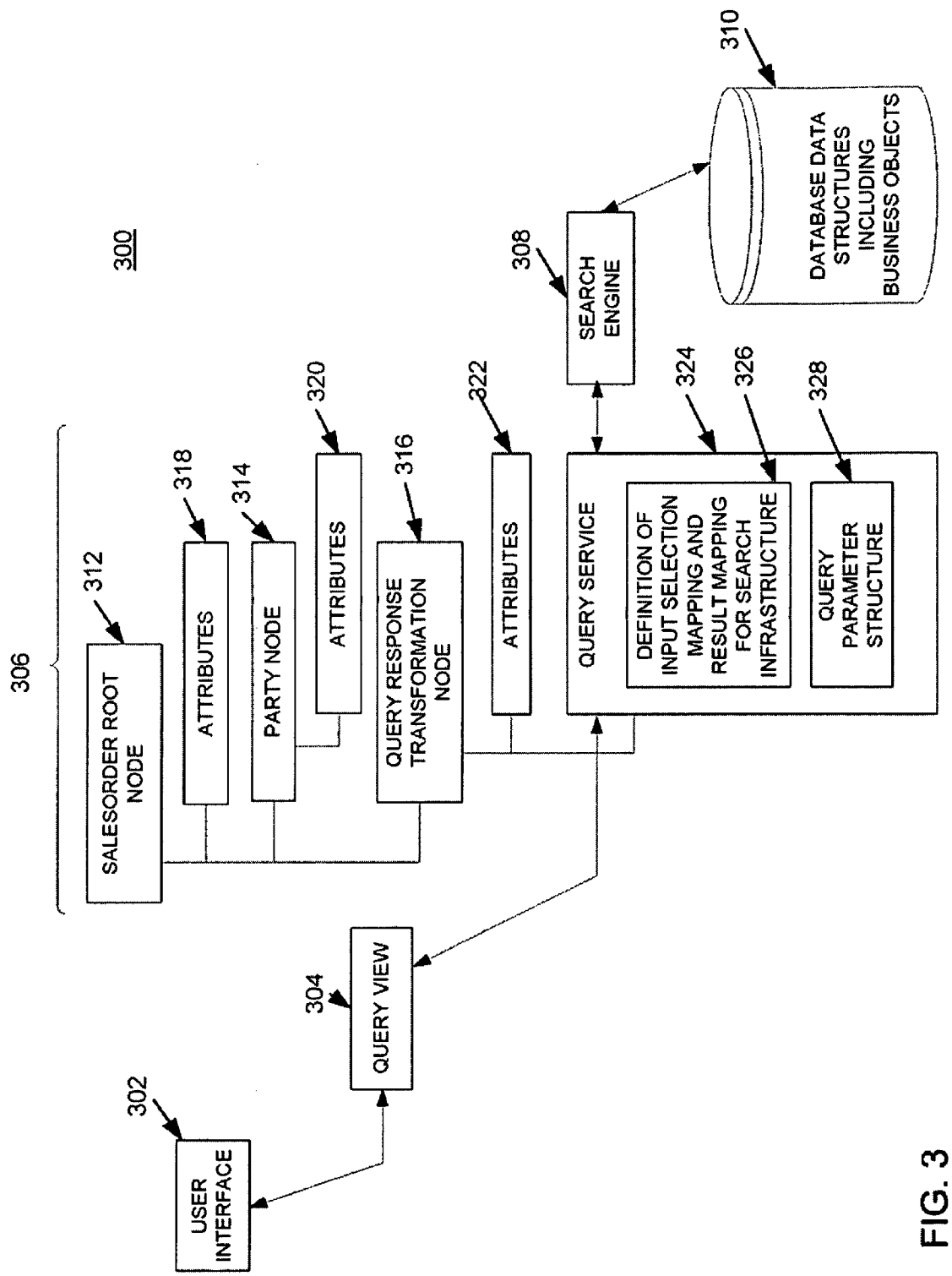
FIG. 3 is a block diagram of a system including a query response service for a client query view.

FIG. 3 is a block diagram of a system 300 including a query response service 324 for a client query view 304. The system 300 of FIG. 3 may be implemented in the system 200 of FIG. 2 and similar components may perform similar functionality. For example, the query response transformation node 255 and the query service 250 of FIG. 2 may perform functionality similar to the functionality of the query response transformation node 316 and the query service 324 of FIG. 3. In general, the components of the system 300 are illustrated in a run-time view with the exception of a business object 306 that is illustrated with a design-time view. Although the business object 306 is illustrated with a design-time view, its functionality with respect to a run-time version of the business object 306 as part of a run-time version of the system 300 will be described.

In general, the operation of the system 300 for the query service 324 may be as follows. A user may use the user interface 302 to enter input, such as query criteria, criteria for results, or both, and the input may be relayed to the query view 304. In addition, the user may cause a query to be performed at the user interface 302 (e.g., by pressing a button of a graphical user interface to initiate a query or by performing other actions that may initiate a query; e.g., a query may be initiated in response to any changes of query criteria or criteria for results). In response to a query being initiated, the query view 304 may call the query service 324 of the business object 306 with a set of parameters for the query. The query service 324 may use the mappings 326 and the query parameter structure 328 to determine criteria for the query, criteria for results of the query, and a mapping of query results to attributes 322 of the query response transformation node 316. The query service 324 may call the search engine 308 to perform a query over business object instances stored in database data structures including business objects 310. Results from the query may be returned by the search engine 308 to the query service 324, which may then populate the attributes 322 of the query response transformation node 316 and use the mappings 326 to populate the query view 304 with data from the attributes 322.

The user interface 302 may be any type of user interface, such as a window-based graphical user interface or a command-line user interface. In general, the user interface 302 may be used by a user to input query criteria, view results of a query, or both.

The query view 304 may be a data structure that may store query criteria and at least a subset of query results. As an example, the query view 304 may be a table that includes rows and columns that may provide a local view of a subset of query results at a client application program. Following that example, metadata of the table may define the query criteria and cells of the table may represent query results. The query view 304 may communicate with the user interface 302 for receiving user input that represents query criteria and for storing query results that are to be displayed in the user interface 302. The query view 304 may contact the query service 324 to request queries to be performed and may receive query results from the query service 324 in response. The structure of the query view 304 may be based on an interface of the query service 324 such that the query service 324 may tailor query result data to the interface which may indirectly be tailored for the query view 304. For examples, attributes which are displayed in the user interface 302 may be used to populate an interface (e.g., in the sense of an application programming interface or message-based interface for remote function calls) for the query service 324, where the query service 324 is logically separated from the user interface 302 such that the backend (i.e., the query service 324) is not aware of the query view 304, but the user interface 302 may transfer requested attributes to the query view 304 (e.g., the query service does not know who the caller, the user interface 302, is), which may in turn transfer attributes to the user interface 302.

In general, the business object 306 is a sales order business object that includes a hierarchy of nodes and those nodes include a hierarchy of attributes. The business object 306 includes a root node 312, attributes 318 of the root node 312, a party node 314, attributes 320 of the party node 314, a query response transformation node 316, attributes 322 of the query response transformation node 316, and a query service 324 of the query response transformation node 316. The business object 306 might represent a run-time instance of a sales order business object that is illustrated as a design-time model of a sales order business object.

The query service 324 includes a definition of input selection mapping and result mapping for a search infrastructure 326, which may be referred to as mappings 326. In addition, the query service 324 may include a query parameter structure 328. The mappings 326 include an input selection mapping from the query view 304 to the query parameter structure 328, and a result mapping from the attributes 322 of the query response transformation node 316 to the query view 304. In general, the mappings 326 may be used to provide mappings for input between the query view 304 and query parameter structure 328 for queries to be performed with the query parameter structure 328 as input for a query, and output between results of a query stored in the attributes 322 and the query view 304. In general, the query service 324 causes a query to be performed on all instances of the business object 306; however, instances of other business objects or business object nodes that are related to the business object 306 may be queried as well (e.g., dependent business objects or associated nodes).

The query parameter structure 328 includes parameters that may be used for queries performed by the search engine 308 on the database data structures including business objects 310. For example, the query parameter structure 328 may include a definition of a query to be performed and values of parameters may be mapped by the query service 324 to the query parameter structure 328, and the parameters may be passed to the search engine 308.

Results of a query may be stored at the attributes 322 of the query response transformation node 316. These results might be read-only and might not be accessible by navigating across nodes of the business object 306, but may be accessible by direct access to the attributes or through the query service 324 as it provides query results to the query view 304. As only a subset of results of a query may be provided to the query view 304, the attributes 322 may store all results of a query such that, for example, results may provided as pages of results to the query view 304 without having to perform a query multiple times.

The query service 324 may allow for querying across attributes of instances of nodes of the business object 306 in a single operation that provides for search and retrieval of query results that relate to attributes from different nodes. This may allow for efficient querying of business objects as results of a query of a specific node need not be followed up with queries of other nodes.

Results of queries from a query service may be organized as attributes of a query response transformation node of a business object that is queried such that results of a query are associated with the business object on which queries are performed. Similarly, one or more query services may be assigned to a business object to which the queries pertain and the attributes of a query response transformation node may contain a union of all results of the query services. These associations may assist with identification and organization of queries on business objects and their results. For example, a user of business objects may be able to easily identify that queries related to a business object may be found under a query response transformation node and results of the queries are to be stored in attributes of the query response transformation node.

The search engine 308 may take as input a query parameter structure from the query service 324 and perform a query on the database data structures including business objects 310. The search engine 308 may be part of a search infrastructure of an enterprise system landscape. The database data structures including business objects 310 may store business object instances, such as instances of the business object 306. The database data structures may be any type of database data structure, such as a multidimensional database.

Figure 4:
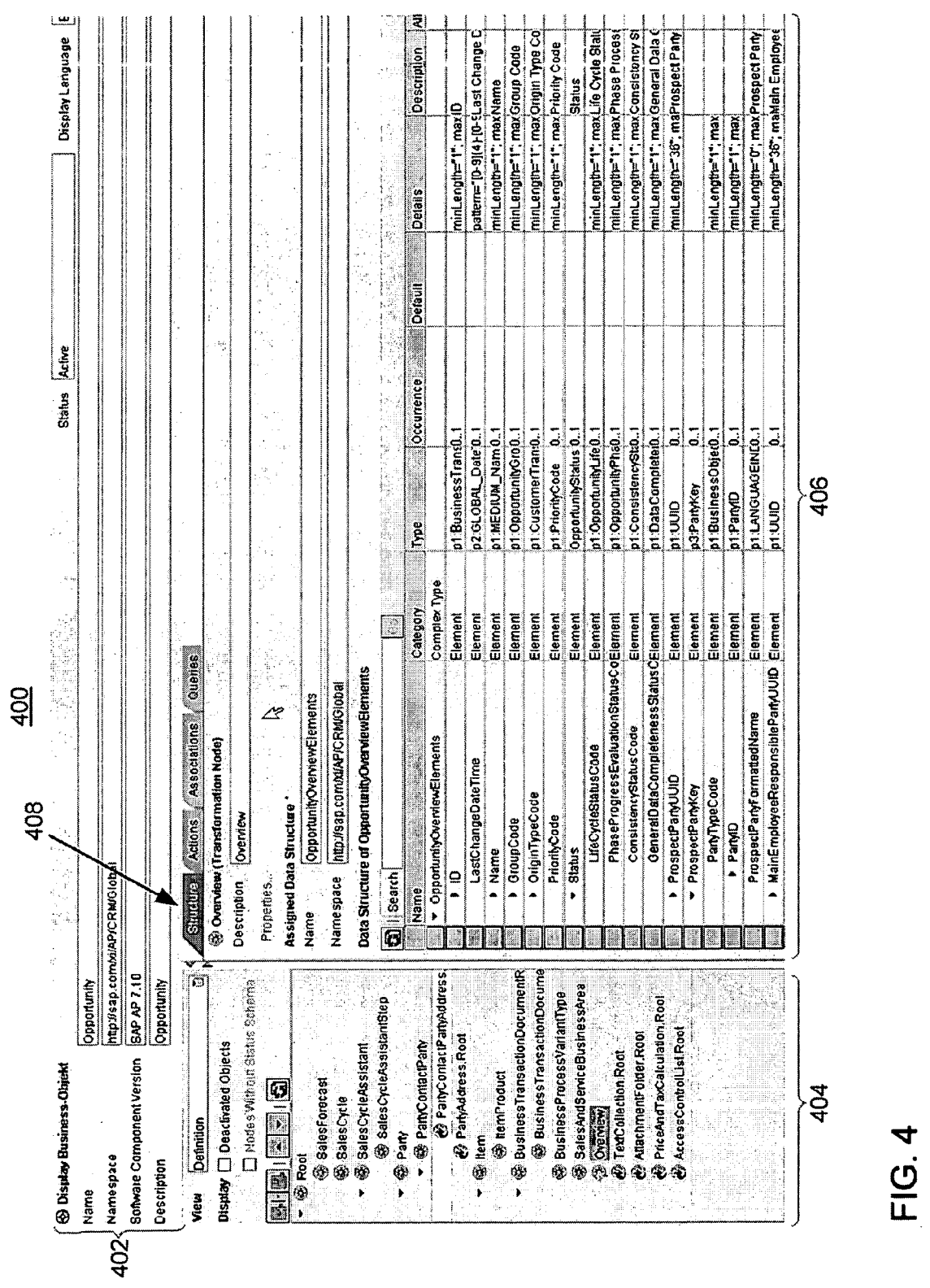
Figure 5:
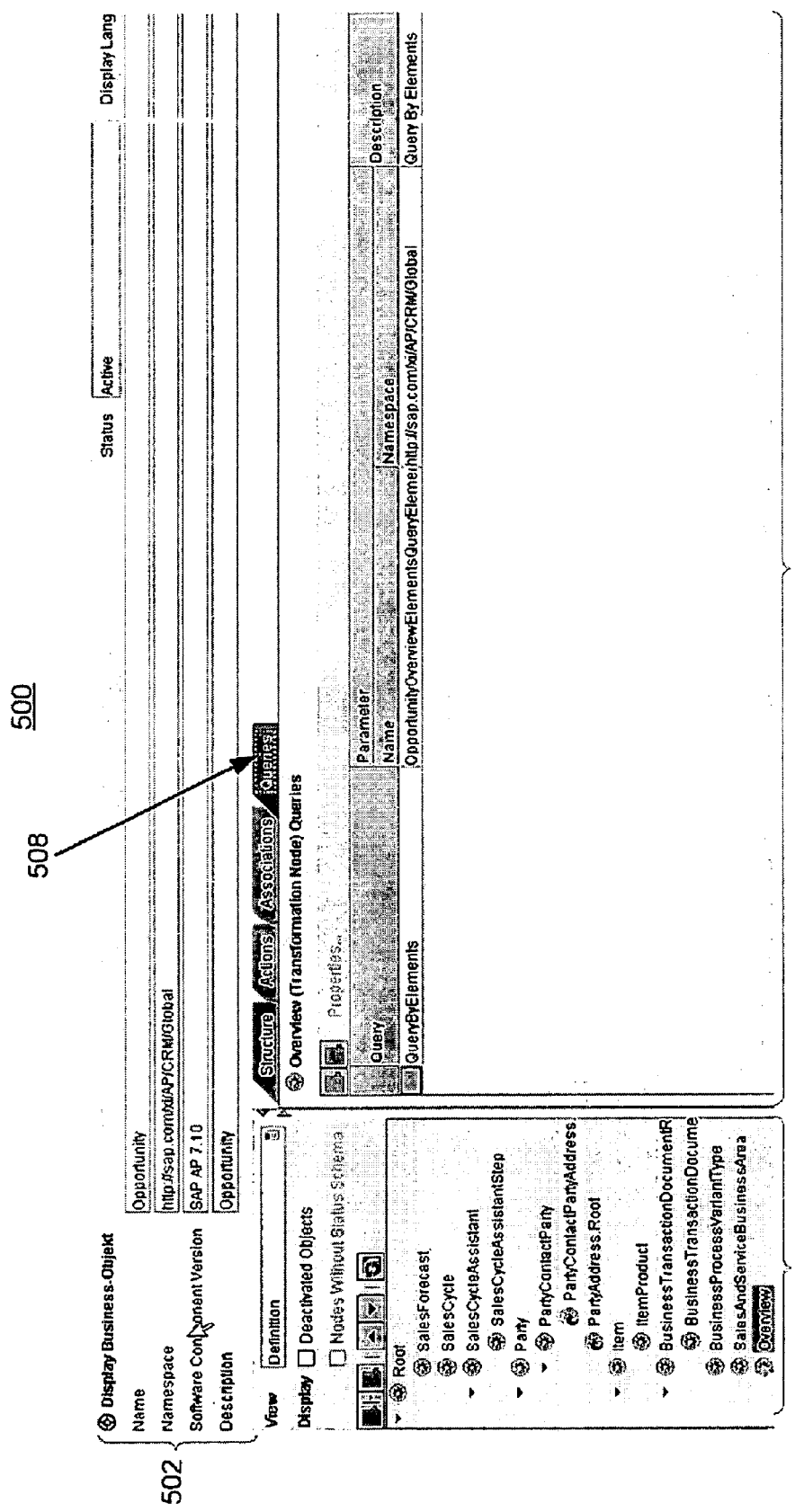

FIGS. 4-5 illustrate user interfaces 400, 500 to navigate a business object that includes a query response transformation node. The user interfaces 400, 500 of FIGS. 4-5 includes a navigation description 402, 502, a business object-level navigation area 404, 504, and a node-level navigation area 406, 506. The navigation description 402, 502 includes a description of a business object model, including a name of a business object and a description. The business object-level navigation area 404, 504 allows a user to view a hierarchical structure of nodes of a business object and navigate across nodes of the business object model by selecting nodes. Features of a node selected in the business object-level navigation area 404, 504 are shown in the node-level navigation area 406, 506. FIGS. 4-5 may be used for development of a design-time model of a business object.

The user interface 400 of FIG. 4 includes a hierarchy of attributes of a query response transformation node labeled "Overview" in the node-level navigation area 406 as indicated by a selection of the structure tab 408. By contrast, the user interface 500 of FIG. 5 includes a list of queries (which may be referred to as query services) assigned to the query response transformation node Overview in the node-level navigation area 406 as indicated by a selection of the queries tab 508. In the example user interface of FIG. 5 for an Overview query response transformation node of an opportunity business object, there is a single query named QueryByElements which has an associated query parameter structure named OpportunityOverviewElementsQueryElements.

Figure 6:
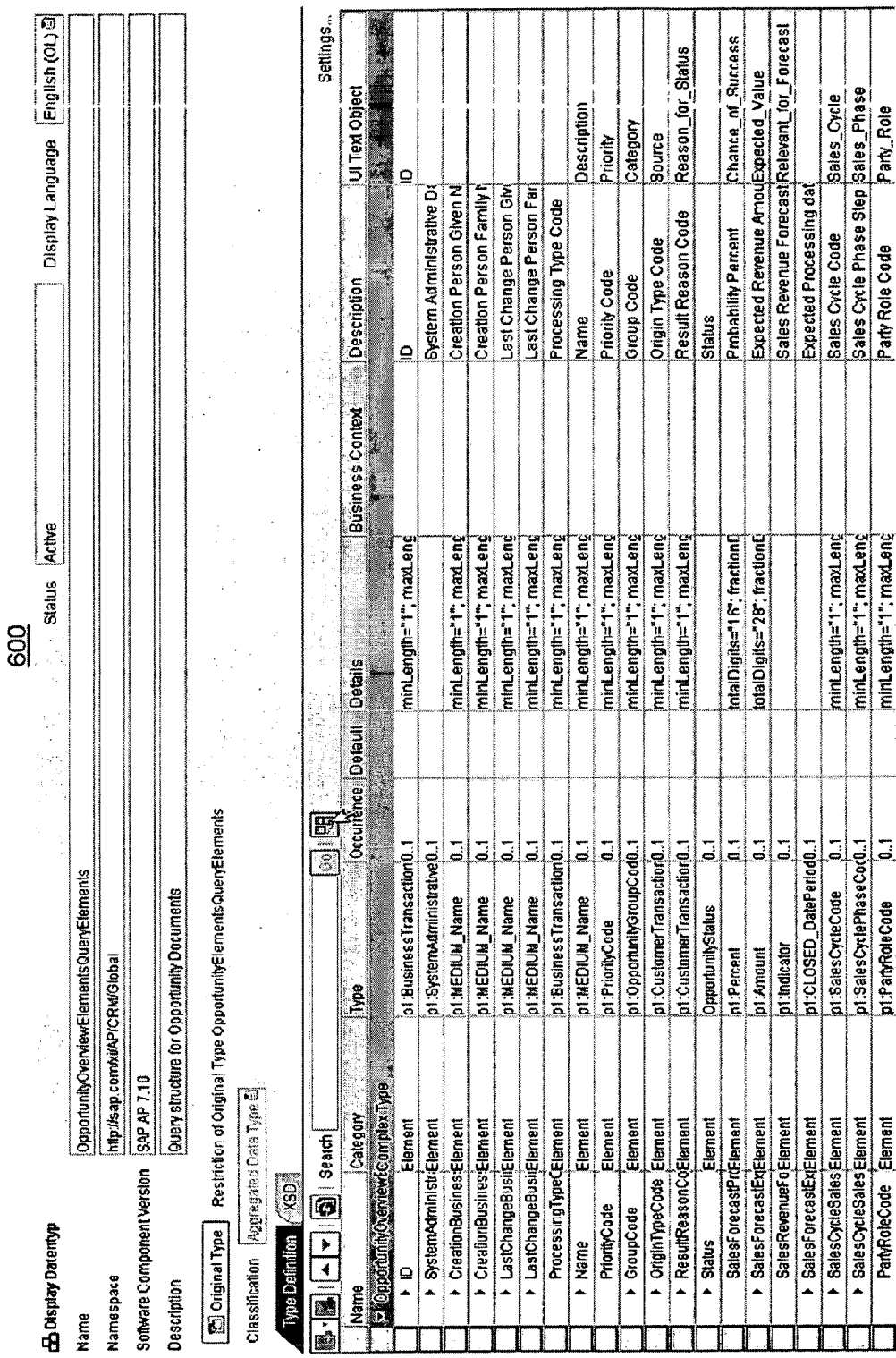
FIG. 6 illustrates a user interface to view a query parameter structure.

FIG. 6 illustrates a user interface 600 to view a query parameter structure. The query parameter structure may be used similar to the query parameter structure 328 of FIG. 3. For example, the query parameter structure may be associated with a query service and used to make a call to a search engine to perform a query. The user interface 600 shows a hierarchy of parameters for a query as shown in the column 602.

Figure 7:
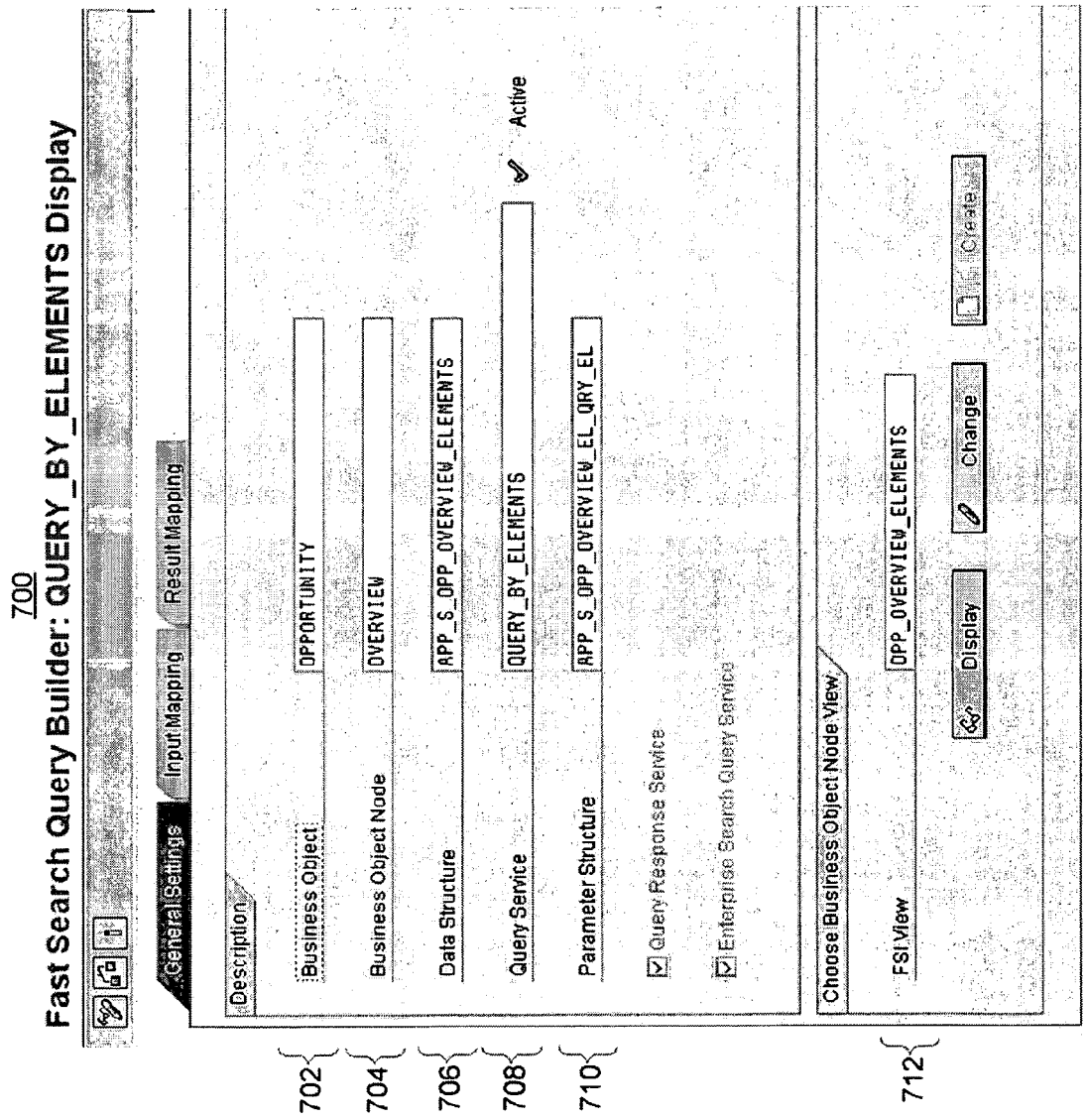
Figure 8:
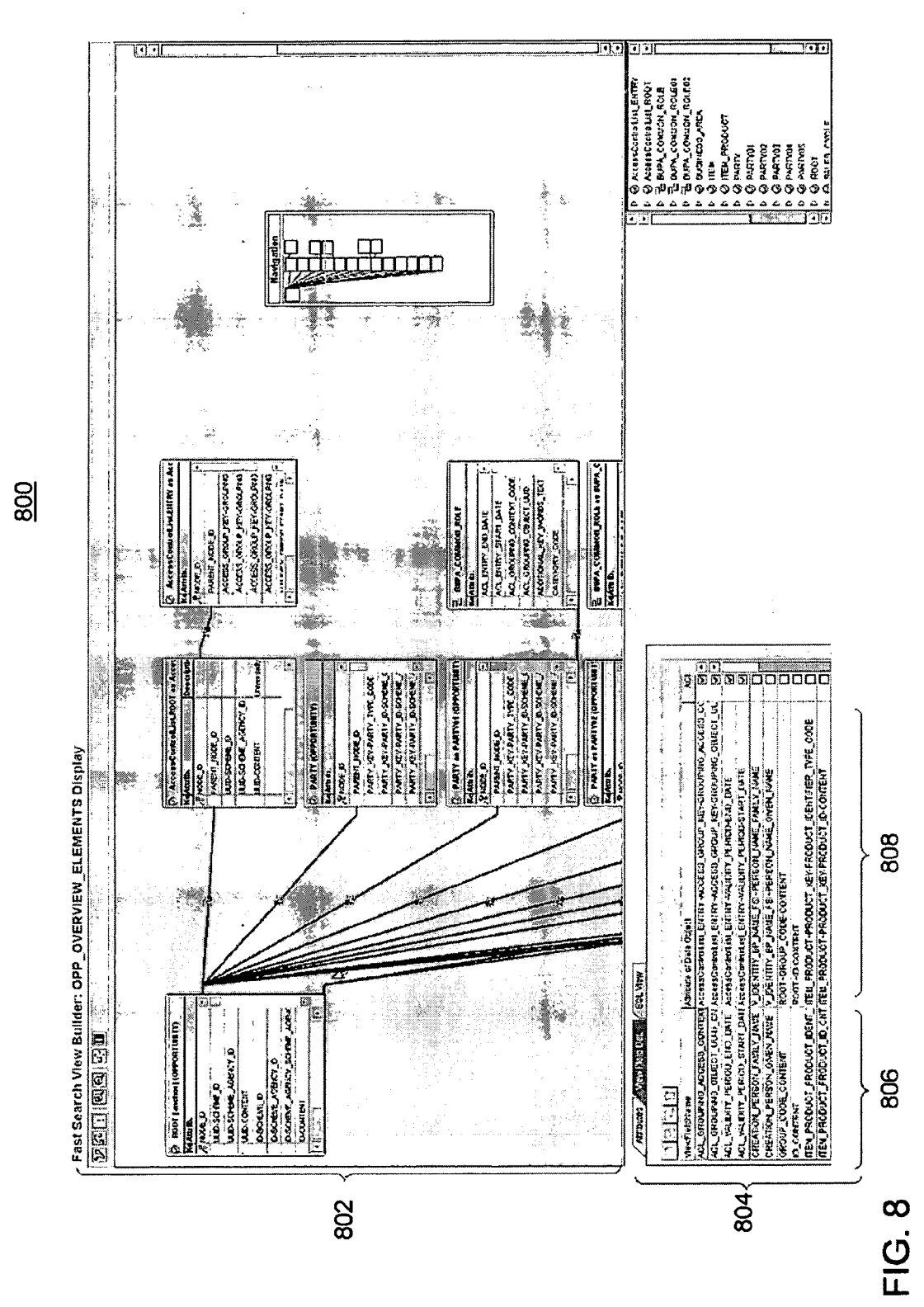
Figure 9:
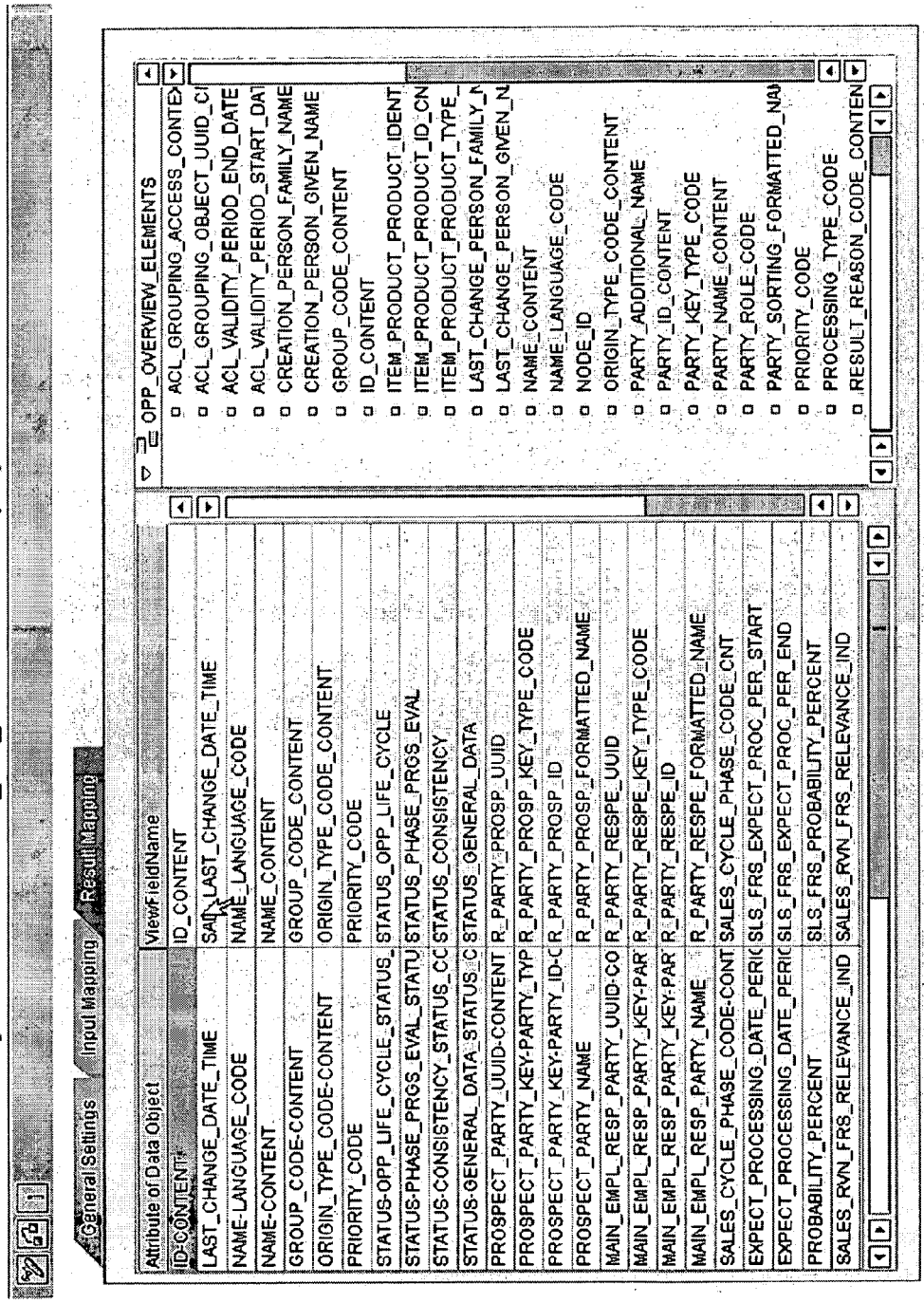

FIGS. 7-9 illustrate user interfaces 700, 800, 900 to build queries to assign to a query response transformation node. The user interfaces are part of a query builder that allows a query to be built, in a design-time environment, in response to settings derived from user input.

The user interface 700 of FIG. 7 shows general settings for a query service named QUERY_BY_ELEMENTS, which may correspond to the query discussed with reference to the user interface 500 of FIG. 5. The settings that may be configured in the user interface 700 include a business object for the query, a business object node to which the query is to be assigned, a name of a data structure for attributes of the business object node to which the query is to be assigned (e.g., a name of the attributes 322 of the query response transformation node 316 of FIG. 3), a name for the query service, a query parameter structure, and a query view corresponding to the query, as shown by the text areas and corresponding text fields 702, 704, 706, 708, 710, 712.

The user interface 800 of FIG. 8 shows windows that may be used in concert to define a query view for a query service. A view that may be configured in the user interface 800 may be the view designated by the text area and corresponding text field 712 of the user interface 700 of FIG. 7. The user interface 800 includes a graph-based navigation area 802 and an attribute selection area 804. In the graph-based navigation area 802 a hierarchical view of nodes of a business object model may be discerned from representations of nodes of a business object as a set of boxes with the hierarchy represented as lines between the boxes. In the attribute selection area 804 attributes of a business object model may be matched with field names of a view as shown by the first column 806 representing fields of a view that corresponds to the second column 808 that has a list of associated attributes of the business object model. The association between view fields and attributes of a business object model may be used to define a mapping between a view and attributes of a query response transition node, attributes of other nodes, or both.

The user interface 900 of FIG. 9 may be used to define mappings from results of a query in a query response transformation node to a query view, which may be referred to as result mapping. The user interface 900 includes an association area 902 which may be used to define associations between attributes of a query response transformation node and a view as shown by the first column of attributes of a data object 904 and the corresponding column of view field names 906. In addition, the user interface 900 includes a navigation area 908 for selecting attributes of a query response transformation node. Although not shown, a user interface similar to the user interface 900 of FIG. 9 may be used to define mappings from a query view to a query parameter structure, which may be referred to as input mapping.

Figure 10:
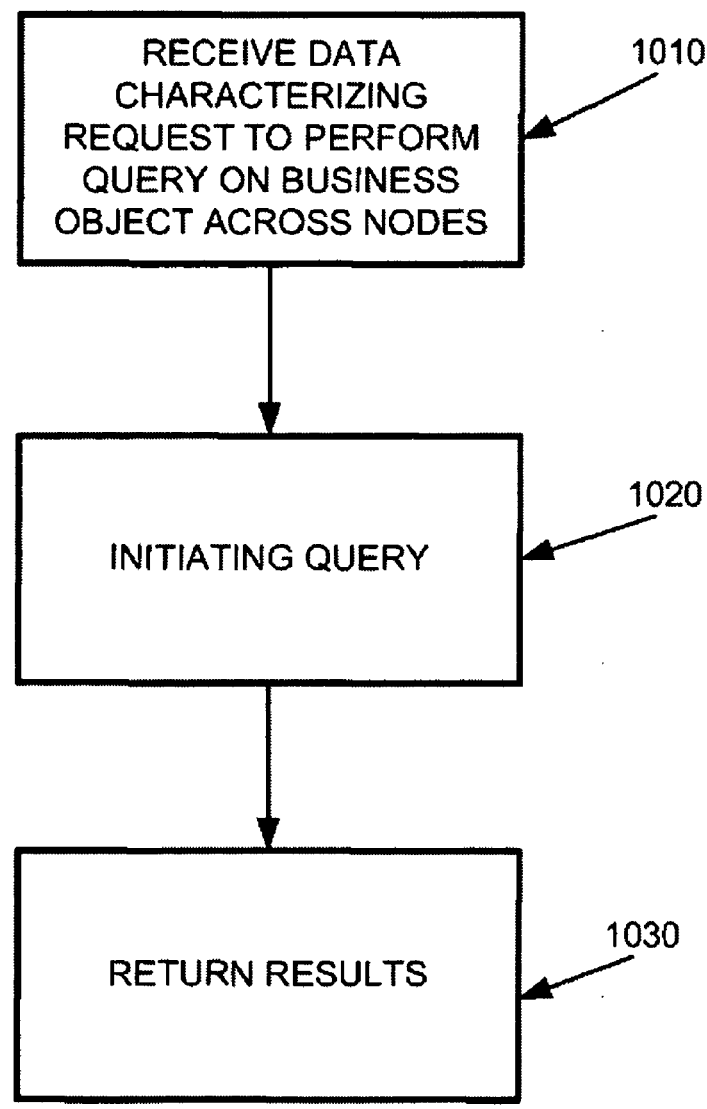
FIG. 10 is a flowchart illustrating a process to perform a query using a query response service.

FIG. 10 is a flowchart illustrating a process 1000 to perform a query using a query response service. The process 1000 may be implemented in the systems 200, 300 of FIGS. 2-3. For example, the process 1000 may be implemented by the query service 324. In general, the process 1000 includes receiving data characterizing a request to perform a query on a business object across nodes of the business object (1010), initiating a query (1020), and returning results (1030).

Data characterizing a request to perform a query on a business object across nodes of the business object is received (1010). The data characterizing the request may be a service call. For example, a query view may perform a service call to a query service. The query may be for a search of attributes located across nodes of instances of a same business object. For example, a query may include querying attributes of instances of a root node of a business object and instances of attributes of child nodes of the business object.

A query is initiated (1020). Initiating a query may include calling a search infrastructure, which may include a search engine, to perform the query or starting a process to perform the query (e.g., in variations of the system 300 the query service 324 may perform a query with direct database accesses; e.g., using joins and the like). Initiating of the query may include sending query parameters, such as the query parameters in the query parameter structure 328 of FIG. 3.

Results are returned (1030). Returning results may include mapping data from a query response transformation node to a data structure corresponding to a system that requested the query. For example, data may be mapped from a query response transformation node to a query view of a client.

Although the systems, user interfaces, and processes of FIGS. 1-10 include certain components, elements, and sub-processes, implementations may vary. For example, systems 200 and 300 may include additional, different, or fewer components. For example, the system 300 need not include the user interface 302, or the user interface 302 and the query view 304, and results from a query may be passed to another application program for further processing. As another example, the sub-process 1010 may include receiving a query to search only attributes of instances of a single node of a business object and return results from attributes of instances of various business object nodes. As another example, the process 1000 may further include sorting, paging, or both of results. As another example, the process 1000 may further include generating a query based on provided settings (e.g., generating the query service 324 based on user input from the user interfaces 700, 800, 900 of FIGS. 7-9).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer-implemented method comprising:
   receiving a request to perform a query on a plurality of instances of at least one business object having a query response transformation node, the query comprising selection criteria for a plurality of attributes across a plurality of nodes for each of the instances of the at least one business object, the selection criteria including at least one query input parameter configured to indicate data to be queried and at least one query output parameter configured to indicate a selection of data to be retrieved from the queried data;
   using the at least one query input parameter, initiating the query on the instances of the at least one business object, wherein the initiating is based on an input selection mapping of a query view for a client service consumer system to a query parameter structure having at least one of the following: the at least one query input parameter and the at least one query output parameter; and
   using the at least one query output parameter, returning results comprising values from the attributes across the nodes corresponding to the selection of data of the at least one business object, wherein the returning is based on a result mapping from attributes of the query response transformation node to the query view for the client service consumer system;
   wherein the query is assigned to a node of the at least one business object and the node to which the query is assigned includes a combination of attributes associated with the plurality of attributes across the plurality of nodes of the at least one business object;
   wherein the attributes of the node to which the query is assigned are a union of query result attributes of queries assigned to the node to which the query is assigned.

2. The method of claim 1, wherein the node to which the query is assigned is a transformation node in a schema of nodes including data nodes, associated nodes, and transformation nodes.

3. The method of claim 1, wherein the method further comprises sorting results on a server and returning results comprises returning sorted results.

4. The method of claim 1, wherein the receiving, initiating, and returning is performed by a query service on a server provider system, the query is performed by a search infrastructure, and the query is requested by the client service consumer system that sends the request in a single operation and receives the results in response to the request.

5. The method of claim 1, wherein the business object comprises a hierarchy of nodes and the nodes comprise a hierarchy of attributes.

6. The method of claim 1, wherein the attributes of the results are a defined subset of the attributes of the at least one business object.

7. A computer program product, tangibly embodied on a computer-readable medium, the product comprising instructions to cause a data processing apparatus to perform operations comprising:
   receiving a request to perform a query on a plurality of instances of at least one business object having a query response transformation node, the query comprising selection criteria for a plurality of attributes across a plurality of nodes for each of the instances of the at least one business object, the selection criteria including at least one query input parameter configured to indicate data to be queried and at least one query output parameter configured to indicate a selection of data to be retrieved from the queried data;
   using the at least one query input parameter, initiating the query on the instances of the at least one business object, wherein the initiating is based on an input selection mapping of a query view for a client service consumer system to a query parameter structure having at least one of the following: the at least one query input parameter and the at least one query output parameter; and
   using the at least one query output parameter, returning results comprising values from the attributes across the nodes corresponding to the selection of data of the at least one business object, wherein the returning is based on a result mapping from attributes of the query response transformation node to the query view for the client service consumer system;

wherein the query is assigned to a node of the at least one business object and the node to which the query is assigned includes a combination of attributes associated with the plurality of attributes across the plurality of nodes of the at least one business object;

wherein the attributes of the node to which the query is assigned are a union of query result attributes of queries assigned to the node to which the query is assigned.

8. The product of claim 7, wherein the node to which the query is assigned is a transformation node in a schema of nodes including data nodes, associated nodes, and transformation nodes.

9. The product of claim 7, wherein the operations further comprises sorting results on a server and returning results comprises returning sorted results.

10. The product of claim 7, wherein the receiving, initiating, and returning is performed by a query service on a server provider system, the query is performed by a search infrastructure, and the query is requested by the client service consumer system that sends the request in a single operation and receives the results.

11. The product of claim 7, wherein the at least one business object comprises a hierarchy of nodes and the nodes comprise a hierarchy of attributes.

12. The product of claim 7, wherein the attributes of the results are a defined subset of the attributes of the at least one business object.

13. A computer-implemented method comprising:

at a query service assigned to a query response transformation node of at least one business object, receiving a request to perform a query on a plurality of instances of the at least one business object, the query to return results comprising a plurality of attributes across a plurality of nodes for each of the instances of the at least one business object, the results being a subset of attributes of the at least one business object specified by the query, the request from a client consumer of the query service;

at the query service, using at least one query input parameter, initiating the query on the instances of the at least one business object by calling a search infrastructure to perform the query, the calling of the search infrastructure comprising a query parameter structure of query criteria, wherein the query criteria includes the at least one query input parameter configured to indicate data to be queried and at least one query output parameter configured to indicate a selection of data to be retrieved from the queried data, wherein the initiating is based on an input selection mapping of a query view for the client consumer to the query parameter structure; and at the query service, using the at least one query output parameter, returning results comprising values from the attributes across the nodes corresponding to the selection of data of the at least one business object to a query view at the client consumer, the returning results to the query view based on a result mapping of attributes of the query response transformation node to fields of the query view;

wherein the query is assigned to a node of the at least one business object and the node to which the query is assigned includes a combination of attributes associated with the plurality of attributes across the plurality of nodes of the at least one business object;

wherein the attributes of the node to which the query is assigned are a union of query result attributes of queries assigned to the node to which the query is assigned.

* * * * *